Sept. 30, 1969         G. K. H. R. UNGER              3,469,329
        METHOD AND APPARATUS FOR THERMALLY DRYING FINE GRANULAR
          MATERIAL OR MUD, ESPECIALLY HIGHLY STICKY POND MUD
Filed Oct. 13, 1967                          3 Sheets-Sheet 1
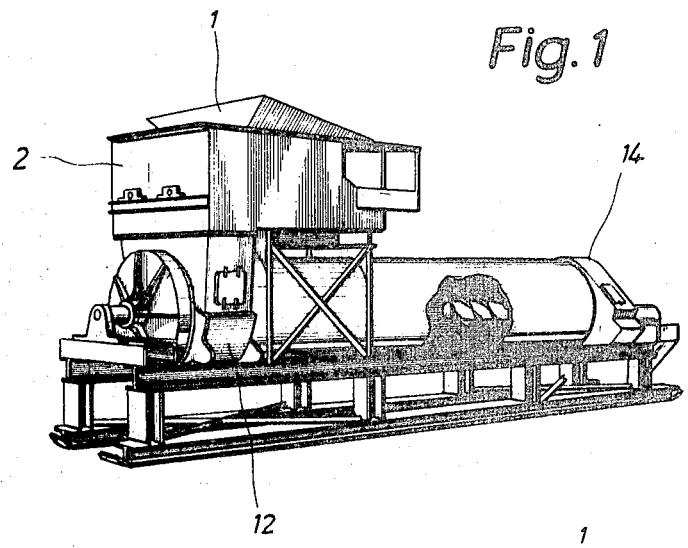
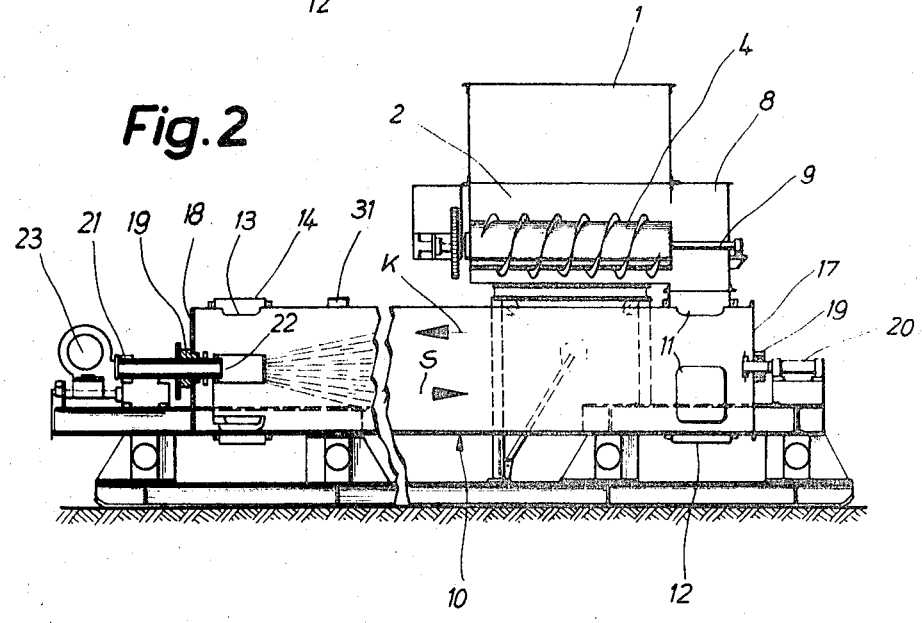
INVENTOR.
Günther K. H. R. Unger
BY

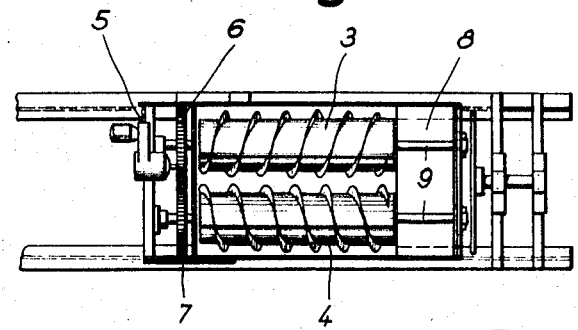
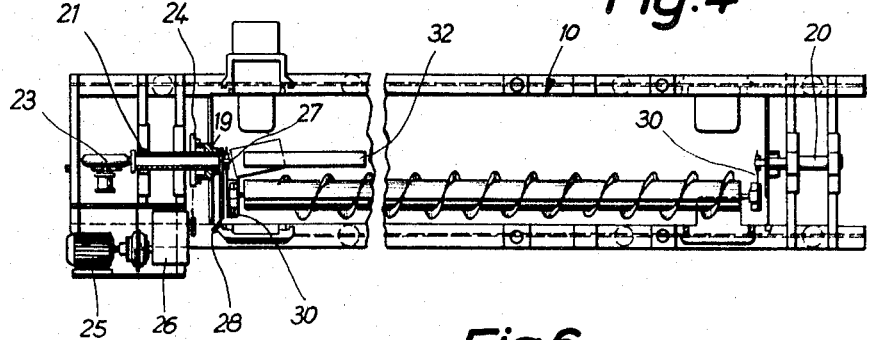
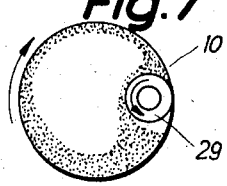
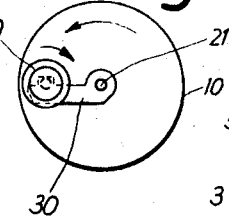
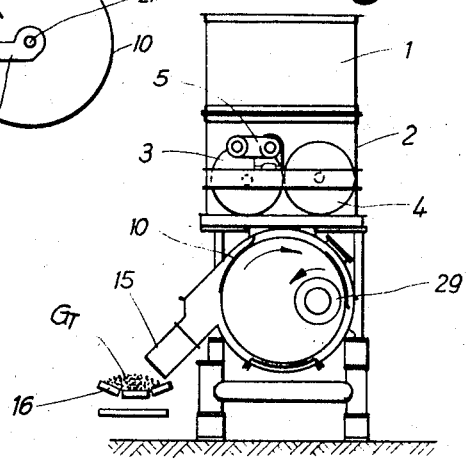
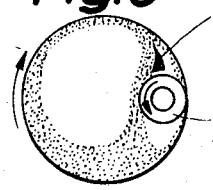

United States Patent Office 3,469,329
Patented Sept. 30, 1969

3,469,329
METHOD AND APPARATUS FOR THERMALLY DRYING FINE GRANULAR MATERIAL OR MUD, ESPECIALLY HIGHLY STICKY POND MUD
Günther K. H. R. Unger, Essen, Germany, assignor to N. V. Handelsonderneming Ploum, Kerkrade, Netherlands
Filed Oct. 13, 1967, Ser. No. 675,176
Claims priority, application Germany, Oct. 18, 1966, U 13,186
Int. Cl. F26b *11/04;* F27b *7/00*
U.S. Cl. 34—137                                    12 Claims

ABSTRACT OF THE DISCLOSURE

The present invention relates to a method of and apparatus for drying fine granular material or mud, according to which the material to be dried is received by and rotated in a drum, dried therein and then discharged.

---

The invention is characterized primarily in that the material to be dried in the drum, after having been centrifugally thrown against the inner wall of the drum, is in a continuous process peeled off said inner drum wall and conveyed away therefrom while it is being dried on its way toward the discharge outlet means.

The present invention relates to a method of and apparatus for thermally drying fine granular material or mud, especially highly sticky pond mud, by means of a rotating drum which carries the fine granular material or the mud to be dried and with a device which withdraws the dried material at the drum.

Vacuum driers for mud or sediments are known in which the mud is applied to the outside of a rotating drum whereupon during the rotation of the drum liquid is withdrawn from the mud through the drum wall. Finally, the dried material is by means of a wiper or the like stripped off the outside of the drum. To this end, the drum is provided with a corresponding screen-like wall through which the liquid can pass into the interior of the drum whereas the solid material of the mud is retained on the outside of the drum. With such heretofore known device, no thermal drying of mud is involved, and the degree of efficiency and output of such devices is not very high.

There have also become known devices for drying of mud which, however, have the following disadvantages. A complete drying of the entire mud is not obtainable because, especially when viscous sticky mud is involved, lumps with a high water content are retained which are difficult or even impossible to split up. Furthermore, these heretofore known driers require a dust withdrawal installation and are sensitive to foreign bodies, such as stones and wood pieces as they are always found in mud ponds. In order with these heretofore known devices to realize an economic output, large and exclusively stationary plants are provided.

It is, therefore, an object of the present invention to provide a method and device of the above mentioned general type which will overcome the above outlined drawbacks.

It is also an object of this invention to provide an apparatus for thermally drying fine granular material or mud, especially viscous highly sticky pond mud, which will overcome the above mentioned drawbacks while being able to be designed for a high output and to be made transportable if desired.

It is another object of this invention to provide a method by means of which fine granular material and mud can quickly and efficiently be dried without requiring a wet dust removal plant.

It is a further object of this invention to provide a method as set forth in the preceding paragraph, which will permit the drying of fine granular material of highly different properties.

Figure 9:
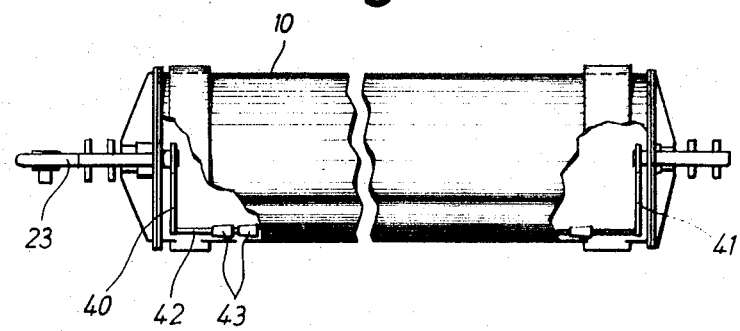
Figure 10:
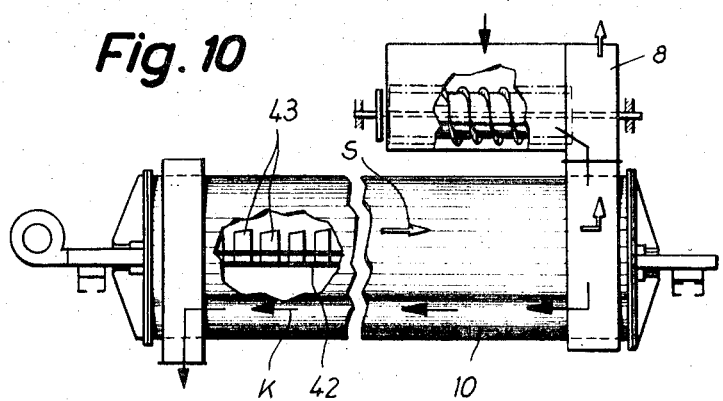
Figure 11:
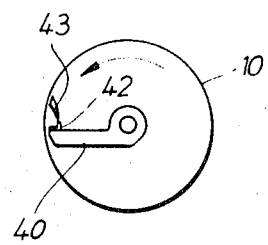

These and other objects and advantages of the invention will appear more clearly from the following specification in connection with the accompanying drawings, in which:

FIG. 1 is a perspective view of an apparatus according to the present invention.
FIG. 2 is a diagrammatic side view of the device according to FIG. 1.
FIG. 3 represents a top view of the charging portion of the apparatus according to the invention.
FIG. 4 is a section through the drum.
FIG. 5 is an end view of the apparatus according to the invention as seen in the direction of the arrow A in FIG. 3.
FIG. 6 shows the end of a worm with a traverse.
FIG. 7 illustrates the distribution of the mud in the drum.
FIG. 8 shows the distribution of the mud when a worm and a peeling knife are employed.
FIG. 9 is a top view of an apparatus according to the invention with strippers in the drum.
FIG. 10 shows the apparatus of FIG. 9 in side view and partially in section.
FIG. 11 shows the mounting of the strippers on a longitudinal beam held on a traverse.

The method according to the present invention is characterized primarily in that the material or the mud is pressed by centrifugal force against a wall and is constantly peeled off from said wall while the material is by means of hot gases or a flame directed upon the mud or the material dried and is continuously conveyed.

Preferably, the hot gases or the flame are directed against the conveying direction of the material or mud.

The peeling off of the material or of the mud from the wall is preferably effected in such a way that the material or the mud is peeled off from the wall and is transported in a direction opposite to the direction in which the material or the mud is being conveyed.

The apparatus according to the present invention is characterized primarily in that one end of the drum is provided with one or more openings for introducing the mud into the interior of the drum while the other end of the drum is provided with one or more outlet openings for releasing the dried material from the drum. In the vicinity of the inner wall of the drum there is provided a worm which rotates in a direction opposite to the direction of rotation of the drum and is journalled parallel to the longitudinal axis of the drum, or within the vicinity of the inner wall of the drum there is provided a stationary wiper or stripper arranged at an angle to the axis of the drum while at the outlet end of the drum a burner or a burner pipe parallel or approximately parallel to the longitudinal axis of the drum extends into the interior of the drum.

According to a further development of the invention, there is provided a drive which is adapted to furnish a rotational speed of the drum at which the centrifugal forces exerted upon the mud to be dried are greater than the force of gravity acting upon the mud.

The diameter of the worm, the rotational speed of which is preferably less than the rotational speed of the drum, is shorter than the drum diameter, and the worm is arranged on that drum wall which during the rotation of the drum moves downwardly.

The worm may be driven by the drum through a corresponding transmission by means of gears so that a single drive will suffice both for the drum and the worm. By changing the transmission ratio of the gears, a desired change in the rotational speed of the worm can be obtained with regard to the rotational speed of the drum.

According to a further development of the invention, a peeling knife is arranged above the worm. This peeling knife is spaced from the adjacent drum wall, and this spacing is greater than the spacing between the worm and the drum wall. Preferably, the peeling knife is arranged in that drum section which is adjacent to the outlet openings of the drum, which means that the peeling knife is located in a drum section where the flame and hot gases of the burner are particularly effective. The peeling knife not only brings about a sliding off from the worm and a cutting up of lumps with still higher liquid content but also protects the worm against the influence of the burner heat or of the hot gases.

The drum may by means of its covers be journalled on two stationary shafts of which one shaft may form a hollow shaft for introducing the burning mixture of the burner into the drum. Also the second shaft may be designed as hollow shaft for introducing lubricant conveying conduits into the interior of the drum.

According to a practical embodiment of the invention, the worm has its ends journalled in a traverse connected to the stationary shafts. One or both traverses may be employed for mounting the peeling knife.

With the embodiment of the device according to the present invention employing strippers, the said strippers are arranged parallel to each other or at an incline with regard to the drum shaft and are journalled on a beam or the like extending from one end to the other end of the drum. In this way the strippers or wipers will similar to the worm windings of the worm bring about a transport of the mud removed from the drum wall in the longitudinal direction of the drum. At the level of its inlet and outlet opening, the drum is laterally and from below and from above surrounded by a mantle or an annular chamber. By means of the mantle or annular chamber, the mud introduced into the drum will be held therein.

Preferably, the circumference of the drum is equipped with temperature feelers of any standard type which when becoming ineffective bring about a turning off of the burners. Such an arrangement will prevent the drums from being exposed to high temperatures. When the device operates in a proper manner, a mud layer will form on the inside of the drum which protects the drum wall against the effect of the hot burner flame or the hot burner gases. This in turn makes it possible that the heat transfer from the hot burner flame and the hot gases is effected directly to the material to be dried. Since the burner flame is directed in a direction opposite to the feeding direction in which the mud to be dried is fed into the drum, while the feeding of the mud in the longitudinal direction of the drum is effected by the worm or the arrangement and positioning of the strippers or wipers, a highly economical exploitation of the heat source of the device will be realized.

In the drum automatically a wet dust withdrawal of the waste gases is effected which can escape through the inlet opening for the mud in the drum. Since the material to be dried, in view of the centrifugal force acting thereupon, also firmly engages the inner wall of the drum, a development of dust in the inlet openings of adjacent drum sections will not occur. Shortly before the dried material leaves the drum, it is possible that, particularly in view of the peeling knife, dust will form. This dust, however, will together with the waste gases or steam vapors be transported in the direction of the inlet opening for the material, while in view of the rotation of the drum and the rotation of the air flow inherent thereto and in view of the centrifugal effect upon the dust, the particles will be deposited upon the wet mud layer on the inner wall of the drum. This in turn will bind the dust. In this way a continuous wet dust withdrawal is effected without the necessity to supply additional water to the apparatus. Therefore, a dust-free or nearly dust-free waste vapor escapes from the outlet of the apparatus.

Referring now to the drawings in detail, the mud to be dried passes through a hopper 1 into a housing 2 in which two feeding worms 3, 4 are journalled which are driven in opposite direction with regard to each other by a common drive 5 through the intervention of gears 6, 7. By means of these two worms, the mud passes into a chute 8 which is open at the top and at the bottom and through which extend the shafts 9 of the worms.

The housing 2 with the above mentioned feeding device is arranged above a drum 10 which at its inlet end has a plurality of spaced and circularly arranged openings 11 through which the mud is adapted to pass from the chute 8 into the interior of the drum 10. In order to prevent the mud during the rotation of the drum from escaping downwardly through the openings 11, the drum is at the level of the chute laterally and at the bottom surrounded either by a mantle or by an annular chamber 12. When the mud in a manner described further below has moved through the drum 10 in the direction of the arrow K, the dried material leaves the pipe through openings 13 at the level of which a mantle or an annular chamber 14 surrounds the drum. The drum or the chamber merge into a discharge spout 15 from which the dried material G can pass onto a conveyor 16.

Both ends of the drum 10 are respectively provided with a cover 17, 18 having centrally located slide bearings 19 which are mounted on the stationary shafts 20, 21. These shafts are designed as hollow shafts and serve on one hand for introducing the mixture for a burner 22 into the drum 10 and on the other hand with regard to shaft 20 serve for introducing lubricating conduits into the interior of the drum 10. The hollow shaft 21 communicates with a blower 23 for producing the necessary burner mixture.

The bearing 19 at the outlet side of the drum 10 has a gear 24 which is rigidly connected to the bearing and through which the drum can be rotated by means of a motor 25 and a transmission 26 in such a way that the centrifugal force acting upon the mud introduced into the drum will be greater than the force of gravity acting upon the mud. By means of the transmission 26 it is possible to control the rotational speed of the drum for realizing the above mentioned goal.

Non-rotatably connected or keyed to the bearing 19 which is rigidly connected to the drum and carries the gear 24 is a further gear 27 located in the interior of the drum. Gear 27 meshes with a gear 28 which serves for driving a worm 29 which is located in the interior of the drum and is arranged eccentrically with regard to the longitudinal axis of the drum in the vicinity of that drum wall which during the rotation of the drum is moving downwardly. The worm windings and the rotation of the worm are so selected that the mud will be stripped from the inner wall of the drum. To this end, the worm rotates in a direction opposite to the direction of rotation of the drum as is clearly shown in FIGS. 6, 7 and 8. From FIG. 7 it will also be clear that the mud to be dried is taken off the drum inner wall 10 by means of the worm 29 in counterclockwise direction.

The worm 29 itself has both ends with its shaft located in two traverses 30 which are fixedly connected to the rigid shafts 20, 21. The shaft of worm 29 extends at the outlet end of the drum through the traverse while at said shaft end there is provided the gear 28.

While the material to be dried is passed through the drum in the direction of the arrow K and is continuously detached from the inner wall of the drum by the worm 29 and is furthermore turned over and fed by the worm to the exit end, the burner flame extends into the interior of the drum and hot burner gases in counter flow, i.e. in the direction of the arrow S, pass through the drum from which after absorption of a corresponding quantity of liquid from the mud, a waste gas-steam vapor passes through the chute 8.

The interior wall of the drum is protected against the hot burner flame and the hot burner gases by the fact that on the inner wall of the drum there is present a layer of more or less wet or moist mud. For safety reasons, the drum may be provided with a temperature sensitive device 31 which communicates with the fuel supply of the burner so that in case of an overheating of the drum, the burner is turned off. Dust which is formed at the outlet side will in view of the waste gas-steam mixture column which rotates with the drum and in view of the centrifugal force exerted upon the dust be thrown against the inner wall of the drum and will there be precipitated out of the wet mud. An additional wet dust withdrawal is therefore not necessary.

In that drum section which comprises the outlet openings 13, there is above the worm 29 provided a peeling knife 32 one end of which may be held on the corresponding traverse 30. By means of this peeling knife, lumps with a high liquid content are broken up or are deviated from the worm without being conveyed in the drum until they are broken up. These lumps are thus first not conveyed further by the worm and rotate at the same level in the drum until they have been broken up and pass between the knife and the adjacent inner wall of the drum into the area of the worm in order to be transported further in the longitudinal direction of the drum.

With the embodiment according to FIGS. 9, 10 and 11, both ends of the drum are again provided with traverses 40, 41 between which a beam 42 extends on which at an incline to the longitudinal axis of the drum and at an angle to the beam 42 there are provided individual strippers or wipers 43. These strippers or wipers have the same effect as the worm 29, namely to remove the material to be dried from the inner wall of the drum and at the same time to see to it that the material is transported further in the longitudinal direction of the drum.

It is, of course, to be understood that the present invention is, by no means, limited to the method and apparatus set forth above, but also comprises any modifications within the scope of the appended claims.

What I claim is:

1. An apparatus for drying material, such as fine granular material, mud, and similar substances, which includes: a rotatable drum having inlet means at one end portion thereof for receiving the material to be dried and having outlet means at the other end portion for discharging the dried material, driving means drivingly connected to said drum for rotating the same, said driving means for said drum being operable to rotate said drum at a speed at which the centrifugal force imparted upon the material being fed into said drum exceeds the force of gravity acting upon the material being fed into said drum, peeling off means arranged within said drum at least near the drum inner wall in that end portion of said drum which comprises said inlet means for peeling material off said inner wall while said drum is rotating and material received thereby is due to the rotation of said drum centrifugally thrown against the inner wall thereof, and heating means within said drum and extending in the direction of the longitudinal axis of said drum.

2. An apparatus according to claim 1, in which said peeling off means is formed by stationary stripper means extending at an angle with regard to the longitudinal axis of said drum.

3. An apparatus according to claim 2, in which the stripper means are arranged substantially parallel to each other, and means extending from one end portion to the other end portion of said drum and supporting said stripper means.

4. An apparatus according to claim 1, in which said heating means is formed by a burner pipe arranged at the outlet means containing end portion of said drum.

5. An apparatus according to claim 1, which includes cover means on the end faces of said drum and closing the ends thereof, and two stationary shafts respectively rotatably journalling said cover means and thereby said drum, one of said shafts being tubular and serving as conduit for feeding fuel to said heating means.

6. An apparatus according to claim 1, which includes mantle means respectively surrounding said drum at the area of its inlet and outlet means and together with the respective adjacent drum portions defining annular chamber means.

7. An apparatus according to claim 1, in which said peeling off means is formed by a worm rotatable in a drum opposite to direction of rotation of said drum.

8. An apparatus for drying material, such as fine granular material, mud, and similar substances, which includes: a rotatable drum having inlet means at one end portion thereof for receiving the material to be dried and having outlet means at the other end portion for discharging the dried material, driving means drivingly connected to said drum for rotating the same, peeling off means arranged within said drum at least near the drum inner wall of that end portion of said drum which comprises said inlet means for peeling material off said inner wall while said drum is rotating and material received thereby is due to the rotation of said drum centrifugally thrown against the inner wall thereof, said peeling off means being formed by a rotatable worm eccentrically arranged within said drum near that wall portion of the drum which during the rotation of said drum moves in downward direction and extending substantially parallel to the axis of rotation of said drum, means for rotating said worm in a direction opposite to the direction of rotation of said drum, and heating means within said drum and extending in the direction of the longitudinal axis of said drum.

9. An apparatus according to claim 8, which includes blade means arranged within said drum above said worm for cutting up lumps of the material to be processed in said drum, the spacing between said blade means and the adjacent drum wall being greater than the spacing between said worm and the adjacent drum wall.

10. An apparatus according to claim 9, in which said blade means is arranged near that drum end portion which comprises the outlet means.

11. An apparatus according to claim 10, in which said heating means is formed by a burner arranged at the outlet means containing end portion of said drum.

12. An apparatus according to claim 8, which includes stationary shaft means rotatably supporting said drum, and traverse means supported by said shaft means and rotatably supporting said worm.

References Cited

UNITED STATES PATENTS

| 1,979,602 | 11/1934 | Bojner | 34—138 XR |
| 2,287,759 | 6/1942 | Hardesty et al. | 34—137 XR |
| 3,020,028 | 2/1962 | Bullock | 34—142 XR |
| 3,142,546 | 7/1964 | Coats | 34—137 |

KENNETH W. SPRAGUE, Primary Examiner

U.S. Cl. X.R.

263—32